United States Patent Office 3,146,218
Patented Aug. 25, 1964

3,146,218
SILOXANE COPOLYMERS CONTAINING ETHYLENE LINKS
Harold A. Clark and Robert H. Leitheiser, Midland, Mich., assignors to Dow Corning Corporation, Midland, Mich., a corporation of Michigan
No Drawing. Filed July 25, 1960, Ser. No. 44,845
2 Claims. (Cl. 260—46.5)

This invention relates to novel siloxane copolymers and to the molded articles made therefrom which exhibit improved high temperature strength.

The thermal stability of phenyl and methyl organopolysiloxane resins is well known and these resins have obtained wide utility in commercial applications where thermal stability is a requirement. These uses include the manufacture of structural members as well as other applications such as coatings and the like.

In spite of the high degree of thermal stability which the organosiloxane resins possess they have the undesirable property of softening at elevated temperatures. This softening occurs even with thermoset silicone resins which are highly cross linked. This behavior is anomalous with respect to thermoset organic resins such as phenolics which do not soften even at the point of degradation. Because of this softening effect in the silicone resins, molded articles made from such resins lose a considerable portion of their mechanical strength at elevated temperatures. This is particularly undesirable since siloxane resins are designed for use at temperatures above 150° C. Consequently it would be highly desirable to prepare siloxane resins which exhibit less loss in mechanical strength at elevated temperatures.

It is the object of this invention to provide novel copolymers of organosiloxanes which when molded show improved mechanical strength at temperatures of 500° F. or above. Other objects and advantages will be apparent from the following description.

This invention relates to copolymers consisting essentially of from 5 to 25 mol percent units of the formula

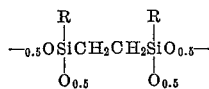

in which R is methyl or phenyl and from 75 to 95 mol percent monophenylsiloxane.

The term "consisting essentially of" means that the copolymers of this invention are composed essentially of the specified units but may include small amounts of other siloxane units such as, for example, monomethylsiloxane, in proportions which do not appreciably affect the mechanical strength of the copolymers at 500° F.

The copolymers of this invention are best prepared by cohydrolyzing phenyltrichlorosilane with silanes of the formula

This cohydrolysis and cocondensation can be carried out in the conventional manner for cohydrolyzing chlorosilanes.

The ethylene linked silanes employed herein are best prepared by reacting a silane containing a vinyl group attached to the silicon with an appropriate silane containing the SiH group. This reaction goes readily in the presence of a catalytic amount of platinum and may be represented by the equation

Thus, for example, one may react phenylvinyldichlorosilane with methyldichlorosilane to produce

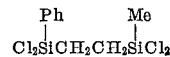

The copolymers of this invention can be mixed with any of the conventional fillers employed with siloxane resins and thereafter molded in the conventional manner to produce molded articles of improved mechanical strength. Specific examples of fillers include glass roving, glass fabric, asbestos fibers, diatomaceous earth, sand, clays, alumina, titania, ferric oxide, carbon black and the like.

The molded articles of this invention are useful as structural members on aircraft and other automotive equipment.

The following examples are illustrative only and should not be construed as limiting the invention which is properly delineated in the appended claims.

In the specification and claims the following abbreviations are used: Ph for phenyl and Me for methyl.

*Example 1*

A mixture of 186 g. of phenyltrichlorosilane, 84 g. of

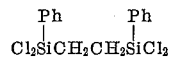

and 100 g. of toluene was added slowly at 20° C. over a period of 45 minutes to a mixture of 200 g. of butyl acetate, 100 g. of toluene, 545 g. of water and 50 g. of isopropanol. The mixture was stirred 1 hour at room temperature after addition was complete. The product layer was separated and washed 3 times with water and then heated to 130° C. to remove low boiling materials. The resulting solution contained 64.3% by weight of the copolymer of the formula 20 mol percent

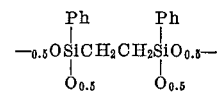

and 80 mol percent monophenylsiloxane.

.1% by weight triethanolamine based on the weight of the copolymer solids was added to this solution. Pieces of 181 glass cloth were dipped in the solution and then heated 10 minutes at 110° C. to give a resin pickup of 33.7%. The impregnated cloth was then stacked in a 6 ply laminate in which alternate plies were at right angles. The laminate was then molded at 175° C. for 30 minutes at 30 p.s.i. The resin content of the resulting laminate was 27.1%. The laminate was then cured by heating 16 hours at 90° C. The temperature was then raised at a rate of 16° C. per hour until 250° C. was reached and heating was continued at this temperature for 12 hours. The flexural strength of the resulting laminate was as follows: 59,100 p.s.i. at room temperature and 30,000 p.s.i. at 500° F.

By contrast the best previously known silicone laminating resin when fabricated into a 6 ply laminate in an identical manner gives laminates of the following flexural strengths: 54,000 p.s.i. at room temperature and 19,500 p.s.i. at 500° F.

*Example 2*

A mixture of 190 g. of phenyltrichlorosilane and 31.8 g. of

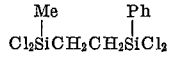

was cohydrolyzed in the manner of Example 1.
The resulting product was a solution of a copolymer of 90 mol percent phenylsiloxane and 10 mol percent siloxane units of the formula

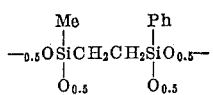

.15% by weight triethanolamine based on the weight of the copolymer was then added to the solution. 181 glass cloth was dipped into this solution and the pieces cured 4 minutes at 110° C. to give a resin pickup of 34.6%. A six ply laminate was formed in an identical manner to that of Example 1 to give a laminate containing 31.8% resin copolymer. This laminate was cured and tested in the manner of Example 1 and was found to have the following flexural strength: 49,700 p.s.i. at room temperature and 26,500 p.s.i. at 500° F.

*Example 3*

Improved high temperature strength is obtained when a copolymer of 90 mol percent monophenylsiloxane and 10 mol percent

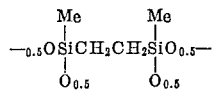

is employed in the procedure of Example 2.

That which is claimed is:

1. As a composition of matter a soluble copolymer consisting essentially of from 5 to 25 mol percent units of the formula

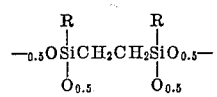

in which R is selected from the group consisting of phenyl and methyl radicals and from 75 to 95 mol percent monophenylsiloxane.

2. As an article of manufacture of improved high temperature strength, a molded article consisting essentially of an inorganic filler bonded with a cured insoluble copolymer resin consisting essentially of 5 to 25 mol percent units of the formula

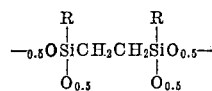

where R is selected from the group consisting of phenyl and methyl radicals and 75 to 95 mol percent monophenylsiloxane.

References Cited in the file of this patent
UNITED STATES PATENTS
2,562,000     Sveda _____ July 24, 1951

OTHER REFERENCES

Meals et al.: "Silcones," Reinhold Publishing, New York (1959), pages 124–128.

Eaborn: "Organosilicon Compounds," Academic Press, New York (1960), pages 466–473.